US012664104B2

(12) United States Patent
 Pan et al.

(10) Patent No.:  US 12,664,104 B2
(45) Date of Patent:  Jun. 23, 2026

(54) METHOD FOR SHARING A STORAGE DEVICE AMONG MULTIPLE PROCESSORS AND ASSOCIATED ELECTRONIC DEVICE

(71) Applicant: Realtek Semiconductor Corp., HsinChu (TW)

(72) Inventors: Xu Pan, Suzhou City (CN); Jialin Mei, Suzhou City (CN); Hong Chang, Suzhou City (CN)

(73) Assignee: Realtek Semiconductor Corp., HsinChu (TW)

( * ) Notice: Subject to any disclaimer, the term of this patent is extended or adjusted under 35 U.S.C. 154(b) by 226 days.

(21) Appl. No.: 18/534,765

(22) Filed: Dec. 11, 2023

(65) Prior Publication Data
 US 2024/0211415 A1      Jun. 27, 2024

(30) Foreign Application Priority Data
 Dec. 21, 2022    (CN) .......................... 202211649496.6

(51) Int. Cl.
 *G06F 13/16*       (2006.01)
 *G06F 9/448*       (2018.01)
(52) U.S. Cl.
 CPC ........ *G06F 13/1663* (2013.01); *G06F 9/4498* (2018.02); *G06F 13/1668* (2013.01)
(58) Field of Classification Search
 None
 See application file for complete search history.

(56) References Cited

U.S. PATENT DOCUMENTS

| | | | | |
|---|---|---|---|---|
| 5,907,862 | A | * 5/1999 | Smalley | G06F 9/52 |
| | | | | 711/151 |
| 8,032,720 | B2 | * 10/2011 | Yu | G06F 12/1441 |
| | | | | 711/163 |

(Continued)

FOREIGN PATENT DOCUMENTS

TW               340922          9/1998

OTHER PUBLICATIONS

Merriam-Webster, "configured", Mar. 22, 2016, 1-5, http://web. archive.org/web/20160322113221/https://www.merriam-webster. com/dictionary/configure (Year: 2016).*

(Continued)

*Primary Examiner* — Christopher D Birkhimer
(74) *Attorney, Agent, or Firm* — Winston Hsu

(57)                    ABSTRACT

A method for sharing a storage device among multiple processors and an associated electronic device are provided. The method includes: controlling a first processor and a second processor to operate in an access mode and a detection mode, respectively; in response to the first processor operating in the access mode, utilizing the first processor to control a logic value of a busy signal, to indicate that the first processor has permission to access the storage device; in response to a first predetermined condition, controlling the first processor to enter the detection mode from the access mode; in response to a second predetermined condition, controlling the second processor to enter the access mode from the detection mode; and in response to the second processor operating in the access mode, utilizing the second processor to control the logic value of the busy signal, to indicate that the second processor has the permission.

15 Claims, 12 Drawing Sheets

(56) References Cited

U.S. PATENT DOCUMENTS

| | | | | |
|---|---|---|---|---|
| 9,477,257 | B1 * | 10/2016 | Kulkarni | G06F 1/3225 |
| 2016/0085479 | A1 * | 3/2016 | Edmiston | H04J 3/0697 |
| | | | | 711/154 |
| 2016/0132438 | A1 * | 5/2016 | Nagasaka | G06F 13/1663 |
| | | | | 710/113 |
| 2017/0109085 | A1 * | 4/2017 | Jinzenji | G06F 3/064 |
| 2017/0123779 | A1 * | 5/2017 | Albot | G06F 12/109 |
| 2017/0123780 | A1 * | 5/2017 | Albot | G06F 8/654 |
| 2017/0286329 | A1 * | 10/2017 | Fernando | G06F 12/0813 |
| 2017/0294227 | A1 * | 10/2017 | Tezuka | G06F 3/061 |
| 2018/0191706 | A1 * | 7/2018 | Hobson | G06F 21/60 |
| 2019/0130135 | A1 * | 5/2019 | Park | G06F 3/0604 |
| 2019/0130953 | A1 * | 5/2019 | Lee | G11C 16/30 |
| 2019/0155704 | A1 * | 5/2019 | Muroyama | G06F 11/2005 |
| 2019/0196533 | A1 * | 6/2019 | Kim | G06F 3/0611 |
| 2019/0243637 | A1 * | 8/2019 | Nachimuthu | G06F 3/0632 |
| 2019/0317902 | A1 * | 10/2019 | Disegni | G06F 13/1663 |
| 2020/0034242 | A1 * | 1/2020 | Mehrotra | G06F 3/067 |
| 2020/0042207 | A1 * | 2/2020 | Kwak | G06F 3/0625 |
| 2020/0057558 | A1 * | 2/2020 | Beloussov | G06F 3/0634 |
| 2020/0058341 | A1 * | 2/2020 | Villa | G11C 11/2257 |
| 2020/0066357 | A1 * | 2/2020 | Oshiyama | G11C 16/3431 |
| 2020/0125504 | A1 * | 4/2020 | Alexander | G06F 13/1668 |
| 2020/0201561 | A1 * | 6/2020 | Mun | G06F 3/0658 |
| 2021/0019090 | A1 * | 1/2021 | Tokumoto | G06F 8/654 |
| 2022/0334764 | A1 * | 10/2022 | Sadeh-Weinraub | |
| | | | | G06F 3/0634 |
| 2023/0004324 | A1 * | 1/2023 | Lim | G06F 3/0679 |

OTHER PUBLICATIONS

Monkbot, "Finite-state machine", Jan. 1, 2021, pp. 1-14, https://en.wikipedia.org/w/index.php?title=Finite-state_machine&oldid=997621162 (Year: 2021).*

* cited by examiner

METHOD FOR SHARING A STORAGE DEVICE AMONG MULTIPLE PROCESSORS AND ASSOCIATED ELECTRONIC DEVICE

BACKGROUND OF THE INVENTION

1. Field of the Invention

The present invention is related to sharing control of flash memories, and more particularly, to a method for sharing a storage device among multiple processors and an associated electronic device.

2. Description of the Prior Art

As circuit integrity and complexity continues to increase, reducing circuit area and cost of peripheral circuits becomes an important issue. In some system chips with complex functions, related arts typically make one central processing unit (CPU) use one independent flash memory for storing required program codes and data. A single mother board may have multiple chips with the same function installed thereon. If each chip on the same mother board uses one independent flash memory, hardware costs and power consumption will be greatly increased.

Thus, there is a need for a novel method and associated architecture which can make multiple chips able to share one external storage device without introducing any side effect or in a way that is less likely to introduce side effects, thereby saving hardware costs and power consumption of peripheral circuits.

SUMMARY OF THE INVENTION

An objective of the present invention is to provide a method for sharing a storage device among multiple processors, and an associated electronic device, wherein the multiple processors are able to properly share the storage device.

At least one embodiment of the present invention provides a method for sharing a storage device among multiple processors. The method comprises: controlling a first processor among the multiple processors to operate in an access mode, and controlling a second processor among the multiple processors to operate in a detection mode; in response to the first processor operating in the access mode, utilizing the first processor to control a logic value of a busy signal, to indicate that the first processor has permission to access the storage device; in response to at least one first predetermined condition, controlling the first processor to enter the detection mode from the access mode; in response to at least one second predetermined condition, controlling the second processor to enter the access mode from the detection mode; and in response to the second processor operating in the access mode, utilizing the second processor to control the logic value of the busy signal, to indicate that the second processor has the permission to access the storage device.

At least another embodiment of the present invention provides a method for sharing a storage device among multiple processors. The method comprises: controlling a first processor among the multiple processors to operate in an access mode, and controlling a second processor among the multiple processors to operate in a detection mode; in response to the first processor operating in the access mode, utilizing the first processor to control a first logic value of a first busy signal, to indicate that the first processor has permission to access the storage device; in response to at least one first predetermined condition, controlling the first processor to enter the detection mode from the access mode; in response to at least one second predetermined condition, controlling the second processor to enter the access mode from the detection mode; and in response to the second processor operating in the access mode, utilizing the second processor to control a second logic value of a second busy signal, to indicate that the second processor has the permission to access the storage device.

At least one embodiment of the present invention provides an electronic device. The electronic device comprises a storage device and multiple processors coupled to the storage device, wherein the storage device is configured to store data and a program code, and the multiple processors are configured to control operations of the electronic device according to the data or the program code stored in the storage device. In detail, when a first processor among the multiple processors operates in an access mode, a logic value of a busy signal is controlled by the first processor, to indicate that the first processor has permission to access the storage device, and a second processor among the multiple processors operates in a detection mode. When an operation of the first processor meets at least one first predetermined condition, the first processor enters the detection mode from the access mode. When an operation of the second processor meets at least one second predetermined condition, the second processor enters the access mode from the detection mode, wherein when the second processor operates in the access mode, the logic value of the busy signal is controlled by the second processor, to indicate that the second processor has the permission to access the storage device.

The method and electronic device provided by the embodiments of the present invention can make multiple processors therein control one busy signal by turns. More particularly, when any processor among the multiple processors is performing an access operation, a logic value of the busy signal is controlled by this processor at this moment, and the other processors may know a state of the access operation by detecting the busy signal. As the busy signal is not controlled by a fixed processor, the sharing mechanism of the present invention will not malfunction in response to abnormal operations of any of the multiple processors. In addition, the embodiment of the present invention will not greatly increase additional costs. Thus, the present invention can enable the multiple processors to properly share the storage device without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
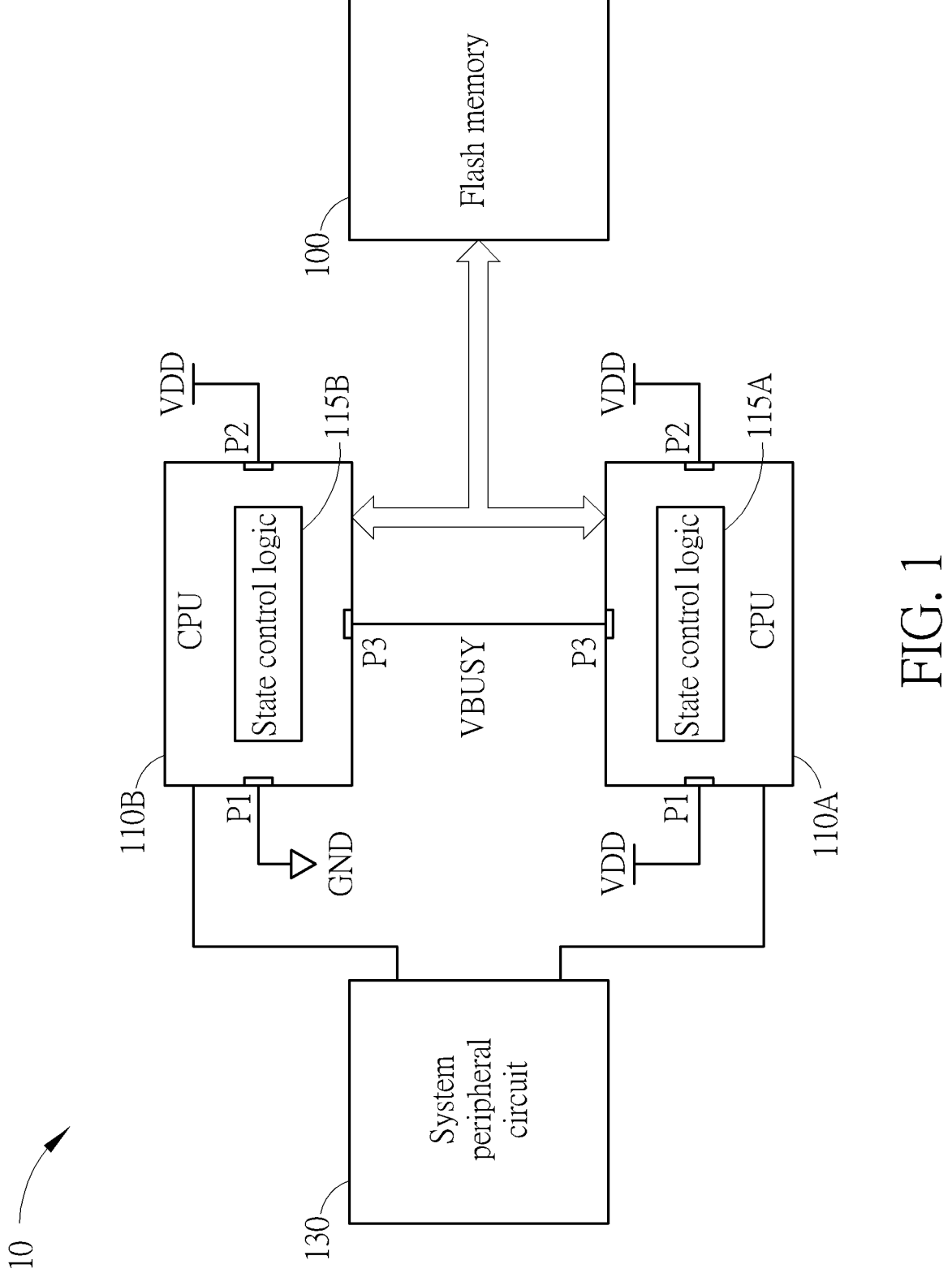
FIG. 1 is a diagram illustrating an electronic device according to an embodiment of the present invention.

FIG. 1 is a diagram illustrating an electronic device according to an embodiment of the present invention. As shown in FIG. 1, the electronic device 10 may comprise a storage device such as a flash memory 100, multiple processors such as central processing units (CPUs) 110A and 110B, and a system peripheral circuit 130, where the flash memory 100, the CPUs 110A and 110B, and the system peripheral circuit 130 may all be connected on a mother board. In this embodiment, the flash memory 100 may be configured to store data and a program code, and the CPUs 110A and 110B may control operations of the electronic device 10 according to the data or the program code stored in the flash memory 100. For example, the CPUs 110A and 110B may be two retimer chips, and the CPUs 110A and 110B may be coupled to two universal serial bus (USB) type-C ports, respectively, where the CPUs 110A and 11B may perform retiming to signals received by the two USB type-C ports, in order to improve signal qualities of high speed signals (e.g., by reducing signal loss) on a printed circuit board (PCB). As the CPUs 110A and 110B execute a same function, the program code and the data in the flash memory 100 can be shared.

In this embodiment, any of the multiple processors (e.g., any of the CPUs 110A and 110B) may comprise multiple general-purpose input/output (GPIO) such as P1, P2 and P3. The GPIO P1 is configured to control which processor among the multiple processors has priority of performing a first access operation of the flash memory 100 after the electronic device 10 is powered on. In this embodiment, as the GPIO P1 of the CPU 110A is coupled to a power supply voltage VDD and the GPIO P1 of the CPU 110B is coupled to a ground voltage GND, the CPU 110A may be regarded as a master processor and has the priority of performing the first access operation of the flash memory 100 after the electronic device 10 is powered on. The GPIO P2 is configured to control whether to enable a function of multiple processors sharing one storage device, where both the GPIO P2 of the CPU 110A and the GPIO P2 of the CPU 110B are coupled to the power supply voltage VDD, and thus a function of the CPUs 110A and 110B sharing the flash memory 100 may be enabled. In some embodiments, either of the CPUs 110A and 110B may be coupled to a dedicated storage device, and the GPIO P2 of this CPU may be coupled to the ground voltage GND to disable the function of sharing the storage device. In addition, the GPIO P3 of the CPU 110A and the GPIO P3 of the CPU 110B may be coupled to each other, and a logic value of a busy signal VBUSY on the GPIO P3 of the CPU 110A and the GPIO P3 of the CPU 110B may be controlled by the CPUs 110A and 110B by turns.

In this embodiment, the CPU 110A may comprise a state control logic 115A, and the CPU 110B may comprise a state control logic 115B, where the state control logic 115A is configured to control an operation mode of the CPU 110A, and the state control logic 115B is configured to control an operation mode of the CPU 110B. For example, when the state control logic 115A controls the CPU 110A to operate in an access mode and the state control logic 115B controls the CPU 110B to operate in a detection mode, the CPU 110A may control the logic value of the busy signal VBUSY via the GIPO P3 thereof to indicate that the CPU 110A has permission of accessing the flash memory 100, and the CPU 110B may detect the logic value of the busy signal VBUSY via the GPIO P3 thereof to determine when an access operation performed by the CPU 110A is finished. In another example, when the state control logic 115B controls the CPU 110B to operate in the access mode and the state control logic 115A controls the CPU 110A to operate in the detection mode, the CPU 110B may control the logic value of the busy signal VBUSY via the GIPO P3 thereof to indicate that the CPU 110B has the permission to access the flash memory 100, and the CPU 110A may detect the logic value of the busy signal VBUSY via the GPIO P3 thereof to determine when an access operation performed by the CPU 110B is finished In addition, serial peripheral interface (SPI) pins of each of the CPUs 110A and 110B which are configured to communicate with the flash memory 100 may be connected to each other (e.g., shorted). For example, the SPI pins of the CPU 110A may be connected to the SPI pins of the CPU 110B, and coupled to a chip enable (CE) pin, a clock pin, a serial in (SI) pin, a serial out (SO) pin, etc., of the flash memory 100. For example, when either processor of the CPUs 110A and 110B operates in the access mode and communicates with the flash memory 100, this processor may pull the CE pin of the flash memory 100 from a logic value "1" to a logic value "0", and the other processor is thereby unable to communicate with the flash memory 100 at this moment.

Figure 2:
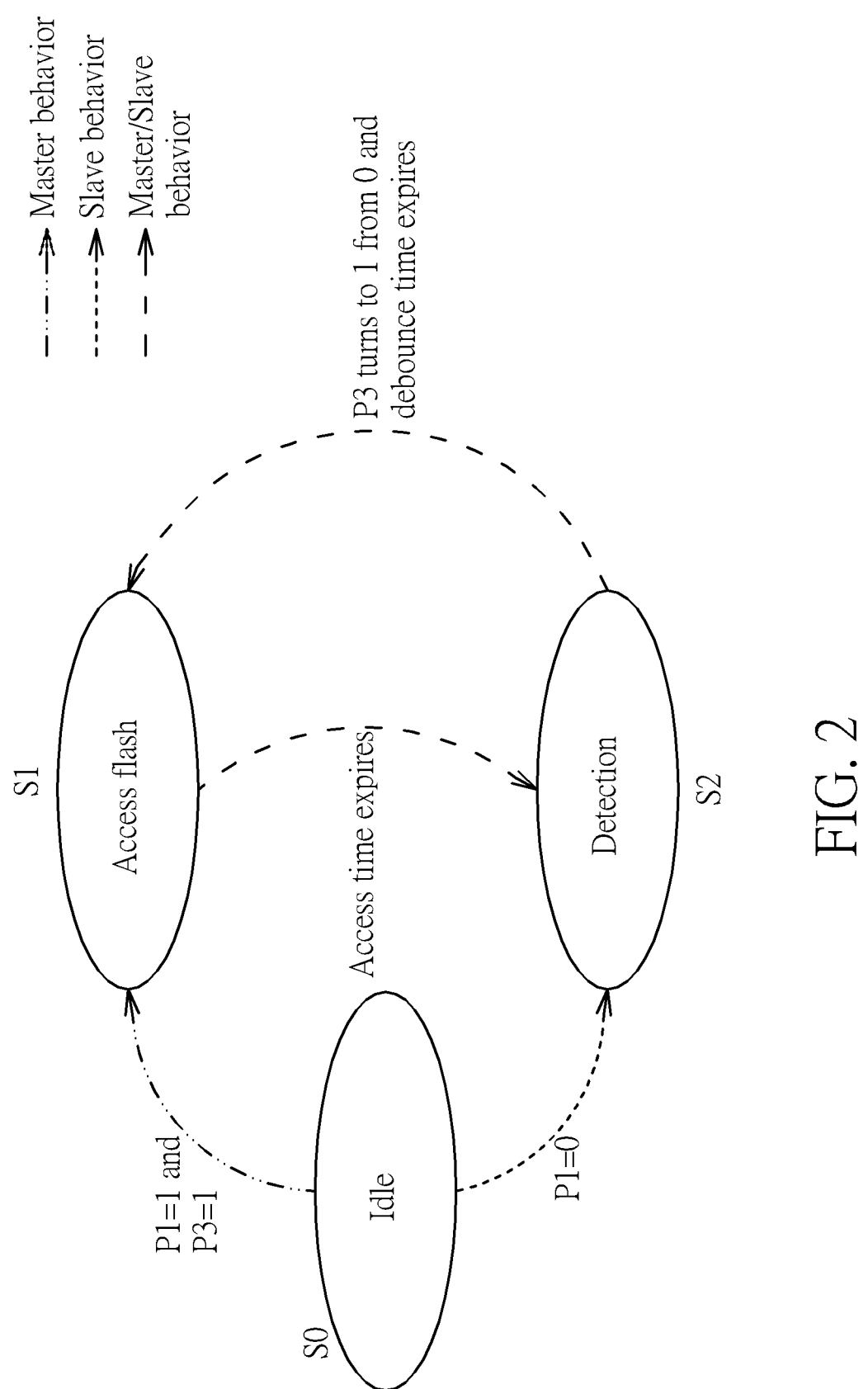
FIG. 2 is a diagram illustrating a mode switching control scheme according to an embodiment of the present invention.

FIG. 2 is a diagram illustrating a mode switching control scheme according to an embodiment of the present invention, where each of the CPU 110A and 110B may operate according to the control scheme shown in FIG. 2. When the electronic device 10 is powered on, both the CPU 110A and 110B enter an idle mode as illustrated by a state S0 (labeled "Idle" for better comprehension) shown in FIG. 2, and the busy signal VBUSY may be initialized to the logic value "1" at this moment. As the GPIO P1 of the CPU 110A is coupled to the power supply voltage VDD to make the GPIO P1 of the CPU 110A have the logic value "1" and the GPIO P3 of the CPU 110A have the logic value "1" (labeled "P1=1 and P3=1" in FIG. 2 for brevity), the state control logic 115A may control the CPU 110A to enter the access mode from the idle mode, as illustrated by a state S1 (labeled "Access flash" for better comprehension) shown in FIG. 2. In addition, as the GPIO P1 of the CPU 110B is coupled to the ground voltage GND to make the GPIO P1 of the CPU 110B have the logic value "0" (labeled "P1=0" in FIG. 2 for brevity), the state control logic 115B may control the CPU 110B to enter the detection mode from the idle mode, as illustrated by a state S2 (labeled "Detection" for better comprehension) shown in FIG. 2. When the CPU 110A operates in the access mode, the state control logic 115A may control the CPU 110A to enter the detection mode from the access mode (e.g., entering the state S2 from the state S1) and release the busy signal VBUSY back to the logic value "1" from the logic value "0" in response to at least one first predetermined condition (e.g., an access time expires). When the CPU 110B operates in the detection mode, the state control logic 115B may control the CPU 110B to enter the access mode from the detection mode in response to at least one second predetermined condition (e.g., the busy signal turning to the logic value "1" from the logic value "0" is detected via the GPIO P3 and a debounce time expires, which is labeled "P3 turns to 1 from 0 and debounce time expires" in FIG. 2 for brevity). Deduced by analogy, the state control logic 115A may control the CPU 110A to enter the access mode from the detection mode (e.g., from the state S2 to the state S1) in response to the at least one second predetermined condition, and the state control logic 115B may control the CPU 110B to enter the detection mode from the access mode in response to the at least one first predetermined condition. Thus, each of the CPUs 110A and 110B may be alternately switched between the access mode and the detection mode, to make the CPUs 110A and 110B control the logic value of the busy signal VBUSY by turns.

Figure 3:
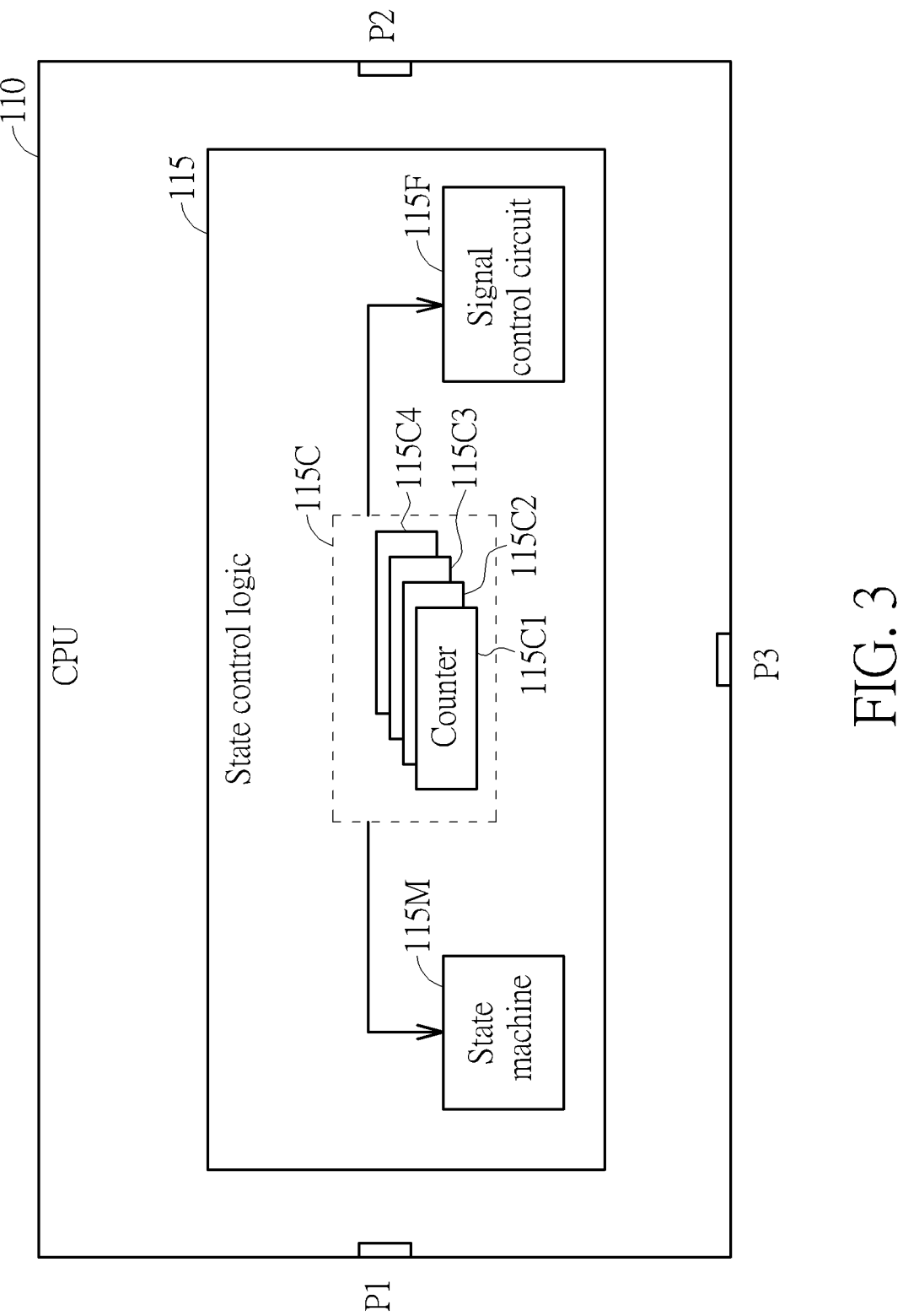
FIG. 3 is a diagram illustrating a processor according to an embodiment of the present invention.

FIG. 3 is a diagram illustrating a processor such as a CPU 110 according to an embodiment of the present invention, where the CPU 110 may be an example of any (e.g., each) of the CPUs 110A and 110B. As shown in FIG. 3, the CPU 110 may comprise GPIOs P1, P2 and P3 and a state control logic 115. In this embodiment, the state control logic 115 may comprise a state machine 115M, a counting module 115C and a signal control circuit 115F. The counting module 115C is coupled to the state machine 115M and the signal control circuit 115F, and the counting module 115C may comprise one or more counters such as 115C1, 115C2, 115C3 and 115C4, but the number of the one or more counters is not limited thereto. The control scheme of FIG. 2 may be executed by the state machine 115M, and the signal control circuit 115F may control operations of the CPU 110 according to a counting result generated by the counting module 115C, e.g., switching between the access mode and the detection mode, where the signal control circuit 115F may have a higher priority of controlling the operations of the CPU 110 than that of the state machine 115; related details will be illustrated in subsequent embodiments. It should be noted that the counting module 115C (e.g., the one or more counters therein) in the CPU 110A and the counting module 115C (e.g., the one or more counters therein) in the CPU 110B perform counting based on a same reference clock signal. Thus, even if frequencies of respective system clocks of the CPUs 110A and 110B may be different, the counting operations of the CPUs 110A and 110B still can be performed based on the same reference.

Figure 4:
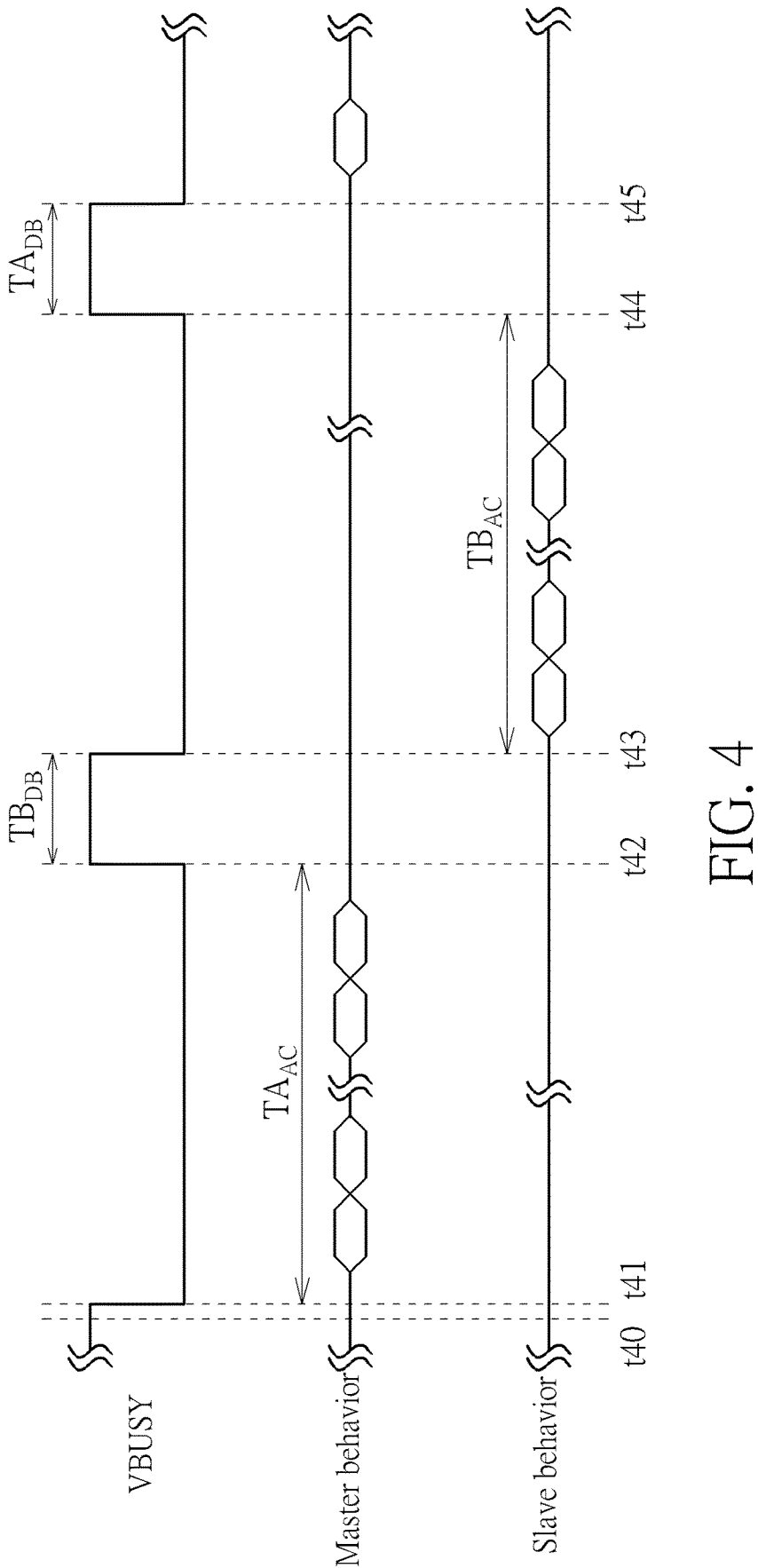
FIG. 4 is a diagram illustrating two processors accessing one storage device by turns according to an embodiment of the present invention.

FIG. 4 is a diagram illustrating two processors (e.g., the CPUs 110A and 110B shown in FIG. 1) accessing one storage device (e.g., the flash memory 100 shown in FIG. 1) by turns according to an embodiment of the present invention. As the GPIO P1 of the CPU 110A is coupled to the power supply voltage VDD and the GPIO P1 of the CPU 110B is coupled to the ground voltage GND, the access operation on the flash memory 100 performed by the CPU 110A is labeled "Master behavior", and the access operation on the flash memory 100 performed by the CPU 110B is labeled "Slave behavior".

At a time point t40, the electronic device 10 is powered on, and the busy signal VBUSY may be initialized to the logic value "1", and both the CPU 110A and 110B operate in the idle mode. At a time point t41, in response to the GPIO P1 of the CPU 110A having the logic value "1", the state control logic 115A (e.g., the state machine 115M therein) may control the CPU 110A to enter the access mode from the idle mode, where in response to the CPU 110A operating in the access mode, the CPU 110A has permission of controlling the busy signal VBUSY and pulls the busy signal VBUSY from the logic value "1" to the logic value "0", to indicate that the CPU 110A has the permission to access the flash memory 100. Thus, the CPU 110A may start accessing the flash memory 100 at the time point t41. In this embodiment, the CPU 110A may enable the counter 115C1 when entering the access mode, and more particularly, the counter 115C1 may start counting at a time point t41 of the CPU 110A pulling the busy signal VBUSY from the logic value "1" to the logic value "0", to generate an access time. When the access time of the CPU 110A reaches a predetermined access time threshold TA$_{AC}$ at a time point t42, which means the access time of the CPU 110A expires, the state control logic 115A (e.g., the state machine 115M therein) may control the CPU 110A to enter the detection mode from the access mode, and may release the busy signal VBUSY back to the logic value "1" from the logic value "0", where the CPU 110A no longer actively controls the logic value of the busy signal VBUSY at this moment, but passively detects the logic value of the busy signal VBUSY.

The CPU 110B may enable the counter 115C2 therein when the busy signal VBUSY being released back to the logic value "1" from the logic value "0" is detected, and more particularly, the counter 115C2 may start counting at the time point t42 of the CPU 110A releasing the busy signal VBUSY back to the logic value "1" from the logic value "0", to generate a debounce time. When the debounce time of the CPU 110B reaches a debounce time threshold TB$_{DB}$ at a time point t43, the state control logic 115B (e.g., the state machine 115M) may control the CPU 110B to enter the access mode from the detection mode, where the CPU 110B may actively control the logic value of the busy signal VBUSY at this moment, and more particularly, may pull the busy signal VBUSY from the logic value "1" to the logic value "0" to indicate that the CPU 110B has the permission to access the flash memory 100. Thus, the CPU 110B may start accessing the flash memory 10 at the time point t43. In this embodiment, the CPU 110B may enable the counter 115C1 therein when entering the access mode, and more particularly, the counter 115C1 may start counting at the time point t43 of the CPU 110B pulling the busy signal VBUSY from the logic value "1" to the logic value "0", to generate an access time. When the access time of the CPU 110B reaches a predetermined access time threshold TB$_{AC}$, which means the access time of the CPU 110B expires, the state control logic 115B (e.g., the state machine 115M therein) may control the CPU 110B to enter the detection mode from the access mode, and may release the busy signal VBUSY back to the logic value "1" from the logic value "0", where the CPU 110B no longer actively controls the logic value of the busy signal VBUSY at this moment, but instead passively detects the logic value of the busy signal VBUSY.

The CPU 110A may enable the counter 115C2 when the busy signal VBUSY being released back to the logic value "1" from the logic value "0" is detected, and more particularly, the counter 115C2 may start counting at a time point t44 of the CPU 110B releasing the busy signal VBUSY back to the logic value "1" from the logic value "0", to generate a debounce time. When the debounce time of the CPU 110A reaches a debounce time threshold $TA_{DB}$ at a time point t45, the state control logic 115A (e.g., the state machine 115M therein) may control the CPU 110A to enter the access mode from the detection mode, where the CPU 110A may actively control the logic value of the busy signal VBUSY at this moment, and more particularly, may pull the busy signal VBUSY from the logic value "1" to the logic value "0" to indicate that the CPU 110A has the permission to access the flash memory 100.

Thus, one of the CPUs 110A and 110B may actively control the logic value of the busy signal VBUSY, and the other may passively detect the logic value of the busy signal VBUSY, in order to control the CPUs 110A and 110B to switch between the access mode and the detection mode with aid of settings of the predetermined access time thresholds $TA_{AC}/TB_{AC}$ and the debounce time thresholds $TA_{DB}/TB_{DB}$. The predetermined access time thresholds $TA_{AC}/TB_{AC}$ may be determined based on a byte count of accessing the flash memory 100, where the predetermined access time threshold $TA_{AC}$ and the predetermined access time threshold $TB_{AC}$ may be the same or different, and the debounce time threshold $TA_{DB}$ and the debounce time threshold $TB_{DB}$ may be the same or different. In addition, the settings of the debounce time thresholds $TA_{DB}/TB_{DB}$ may ensure that the CPUs 110A and 110B will not operate in the access mode at a same time, thereby reducing a probability of a conflict between the access operations of the CPUs 110A and 110B. It should be noted that the predetermined access time thresholds $TA_{AC}/TB_{AC}$ and the debounce time thresholds $TA_{DB}/TB_{DB}$ may be stored in registers in the CPUs 110A and 110B, and may be set or adjusted by external writing, but the present invention is not limited thereto.

In some embodiments, when the CPU 110A does not send any instruction and the access time of the CPU 110A reaches a minimum access time threshold $TA_{AC,MIN}$ during a period while the CPU 110A operates in the access mode, the signal control circuit 115F in the CPU 110A may control the 110A to enter the detection mode from the access mode in advance, and may release the busy signal VBUSY back to the logic value "1" from the logic value "0" in advance, where the minimum access time threshold $TA_{AC,MIN}$ is less than the predetermine access time threshold $TA_{AC}$. In some embodiments, when the CPU 110B does not send any instruction and the access time of the CPU 110B reaches a minimum access time threshold $TB_{AC,MIN}$ during a period while the CPU 110B operates in the access mode, the signal control circuit 115F in the CPU 110B may control the 110B to enter the detection mode from the access mode in advance, and may release the busy signal VBUSY back to the logic value "1" from the logic value "0" in advance, where the minimum access time threshold $TB_{AC,MIN}$ is less than the predetermined access time threshold $TB_{AC}$. It should be noted that the minimum access time thresholds $TA_{AC,MIN}/TB_{AC,MIN}$ may be stored in registers in the CPUs 110A and 110B, respectively, and may be set or adjusted by external writing, but the present invention is not limited thereto. In addition, the minimum access time thresholds $TA_{AC,MIN}$ and $TB_{AC,MIN}$ may be the same or different.

Figure 5:
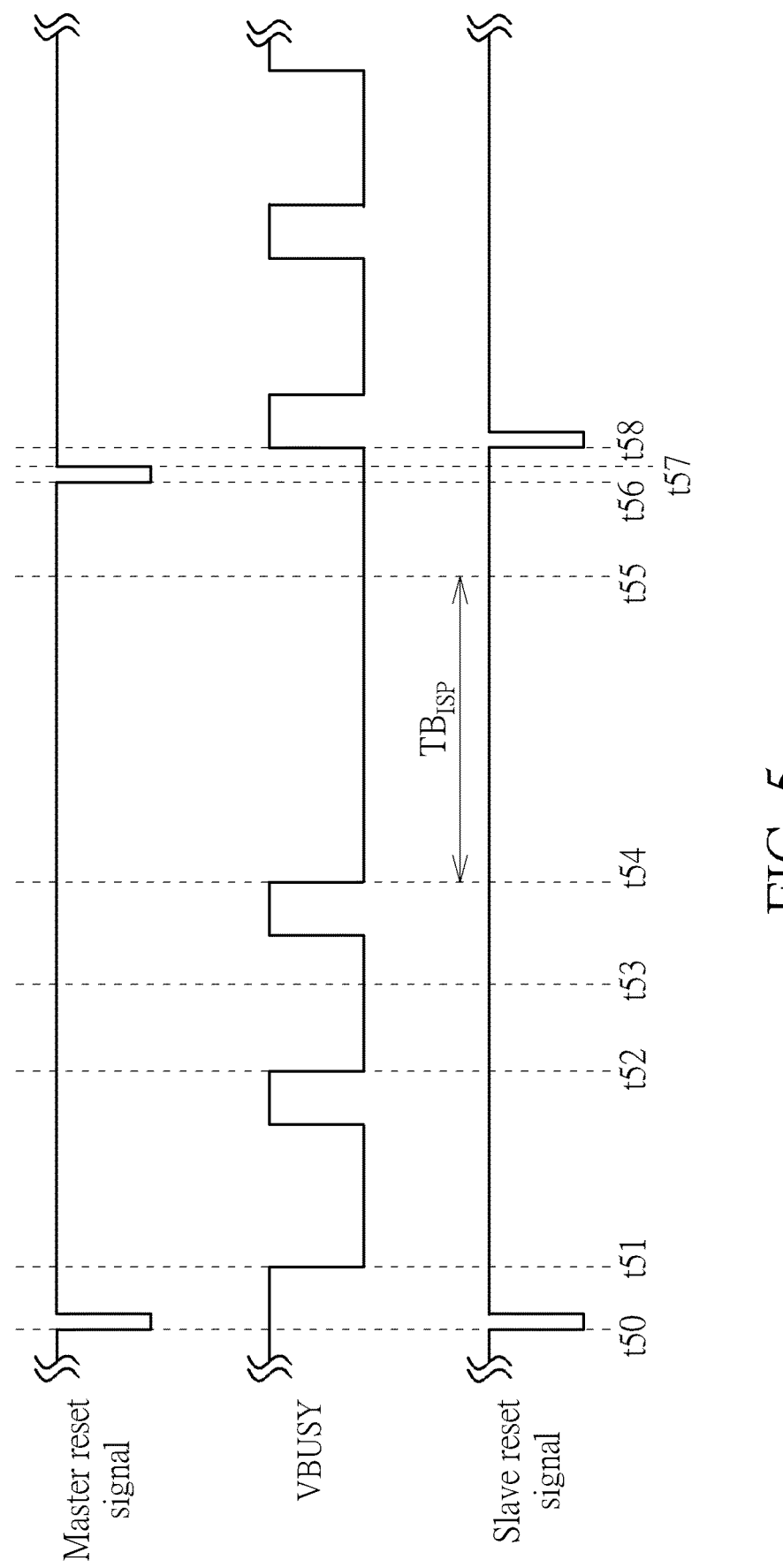
FIG. 5 is a diagram illustrating programing of a firmware update performed by one of two processors according to an embodiment of the present invention.

FIG. 5 is a diagram illustrating programing of a firmware update performed by one of two processors (e.g., the CPUs 110A and 110B shown in FIG. 1) according to an embodiment of the present invention. A master reset signal shown in FIG. 5 may be configured to indicate timing of a master processor such as the CPU 110A shown in FIG. 1 performing a soft reset, and a slave reset signal shown in FIG. 5 may be configured to indicate timing of a slave processor such as the CPU 110B performing a soft reset. In this embodiment, the electronic device 10 may be powered on at a time point t50, and the CPUs 110A and 110B may perform the soft reset at a same time, where the CPUs 110A and 110B may enter the idle mode after completing the soft reset. At a time point t51, the CPU 110A may have priority of entering the access mode after being powered on at the time point t50, and the CPU 110B enters the detection mode first. At a time point t52, the CPU 110B may enter the access mode, and the CPU 110A may operate in the detection mode at this moment. In this embodiment, an update equipment such as an in-system programming (ISP) tool is coupled to the CPU 110A, and the ISP tool may write an updated program code into the flash memory 100 via the CPU 110A during a period while the CPU 110A operates in the access mode, in order to perform a firmware update of the electronic device 10. It should be noted that the ISP tool may determine whether to immediately start performing the firmware update according to an operation mode of the CPU 110A. For example, when the ISP tool determines that the CPU 110A is operating in the detection mode, the ISP tool may wait for the CPU 110A to enter the access mode in order to execute the firmware update (e.g., corresponding erasing/ISP operations); and when the ISP tool determines that the CPU 110A is operating in the access mode, the ISP tool may immediately start performing the firmware update. In this embodiment, the ISP tool starts sending a request of the firmware update to the CPU 110A at a time point t53. As the CPU 110A operates in the detection mode at the time point t53, the firmware update may be started until the CPU 110A enters the access mode at a time point t54. In this embodiment, the CPU 110B may utilize the counter 115C3 therein to start counting at the time point t54 which the busy signal VBUSY is pulled to the logic value "0" by the CPU 110A is detected, to generate an update time, where the update time reaches an update time threshold $TB_{ISP}$ at a time point t55. At a time point t56, the ISP tool may complete the firmware update, and control the CPU 110A to perform the soft reset. At a time point t57, the ISP tool may complete the soft reset of the CPU 110A, to make the CPU 110A enter the idle mode and release the busy signal VBUSY back to the logic value "1" from the logic value "0" at a time point t58. As the CPU 110B detects that the busy signal VBUSY is released back to the logic value "1" from the logic value "0" and the update time generated by the counter 115C3 in the CPU 110B reaches the update time threshold $TB_{ISP}$ at the time point t58, the PCU 110B may perform the soft reset. After the firmware update mentioned above is completed and the soft resets of the CPUs 110A and 110B are completed, the CPUs 110A and 110B may access the flash memory 100 by turns again in the way shown in FIG. 4, and may operate normally based on updated firmware at this moment.

In some embodiments, the ISP tool may be coupled to the CPU 110B, in order to perform the firmware update to the electronic device 10 via the CPU 110B. Those skilled in this art may understand implementation of performing the firmware update to the electronic device 10 via the CPU 110B by analogy according to the embodiment of FIG. 5, and related details are omitted here for brevity.

Figure 6:
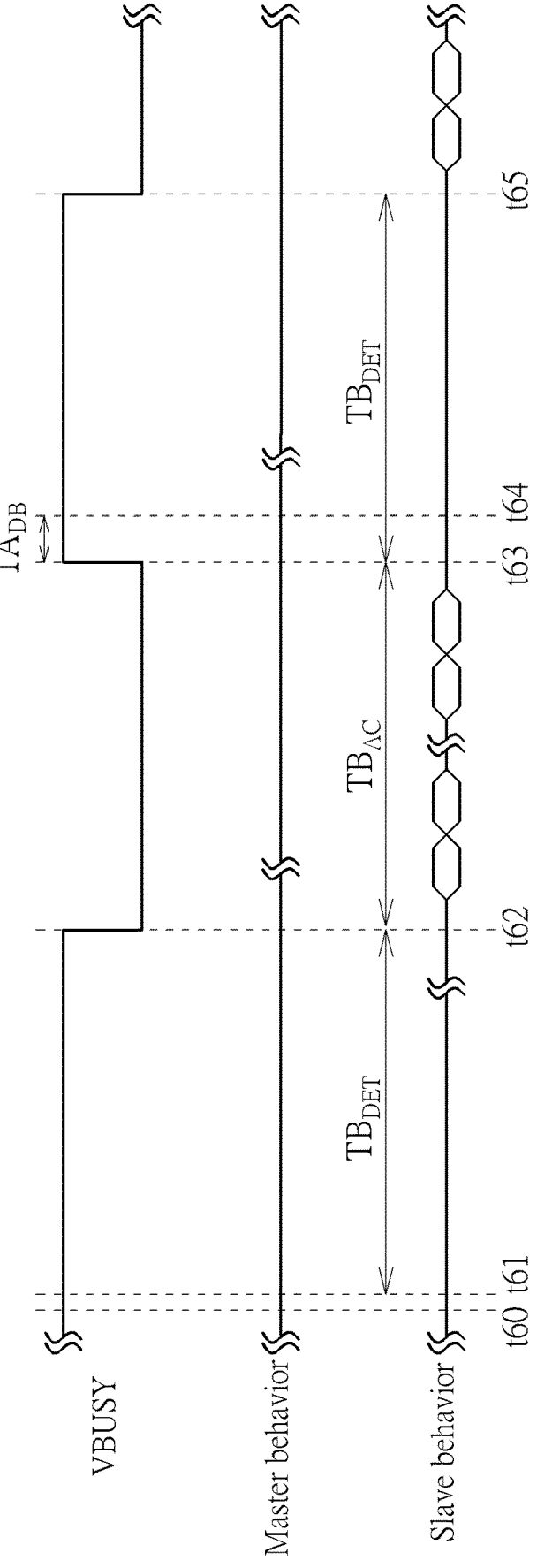
FIG. 6 is a diagram illustrating a timing of error handling in response to a condition where a master processor is unable to pull down a busy signal after being powered on according to an embodiment of the present invention.

FIG. 6 is a diagram illustrating a timing of error handling in response to a condition where a master processor (e.g., the CPU 110A shown in FIG. 1) is unable to pull down the busy signal VBUSY after being powered on according to an embodiment of the present invention. In this embodiment, the electronic device 10 may be powered on at a time point t60, and the CPUs 110A and 110B may enter the idle mode. At a time point t61, the CPU 110A is unable to pull the busy signal VBUSY to the logic value "0", and is therefore unable to normally access the flash memory 100. In addition, the CPU 110B may enter the detection mode from the idle mode at the time point t61, where the CPU 110B may utilize the counter 115C4 therein to start counting at the time point t61 of the CPU 110B starting operating in the detection mode, to generate a detection time. When the detection time of the CPU 110B reaches a detection time threshold $TB_{DET}$ at time point t62, even though the CPU 110B does not detect the busy signal VBUSY being released back to the logic value "1" from the logic value "0", which makes the state machine 115M in the CPU 110B unable to control the CPU 110B to enter the access mode from the detection mode according to the control scheme shown in FIG. 2, in response to the detection time of the CPU 110B reaching the detection time threshold $TB_{DET}$ and the logic value of the busy signal VBUSY being maintained at "1", the signal control circuit 115F of the CPU 110B can control the CPU 110B to enter the access mode from the detection mode and pull the busy signal VBUSY from the logic value "1" to the logic value "0". At a time point t63, the CPU 110B may enter the detection mode from the access mode and release the busy signal back to the logic value "1" from the logic value "0", where the CPU 110B may utilize the counter 115C4 therein to start counting at the time point t63, to generate the detection time. If the operation of the CPU 110A is back to normal at this moment, the CPU 110A may enter the access mode in response to the debounce time thereof expiring at a time point t64, and subsequent operations may be executed according to the control scheme shown in FIG. 2. If the CPU 110A is still unable to pull the busy signal VBUSY to the logic value "0" at this moment, the CPU 110B may enter the access mode at a time point t65 again in response to the detection time expiring. Thus, under a condition where the CPU 110A is unable to normally pull down the busy signal VBUSY, the CPU 110B is still able to access the flash memory 100.

Figure 7:
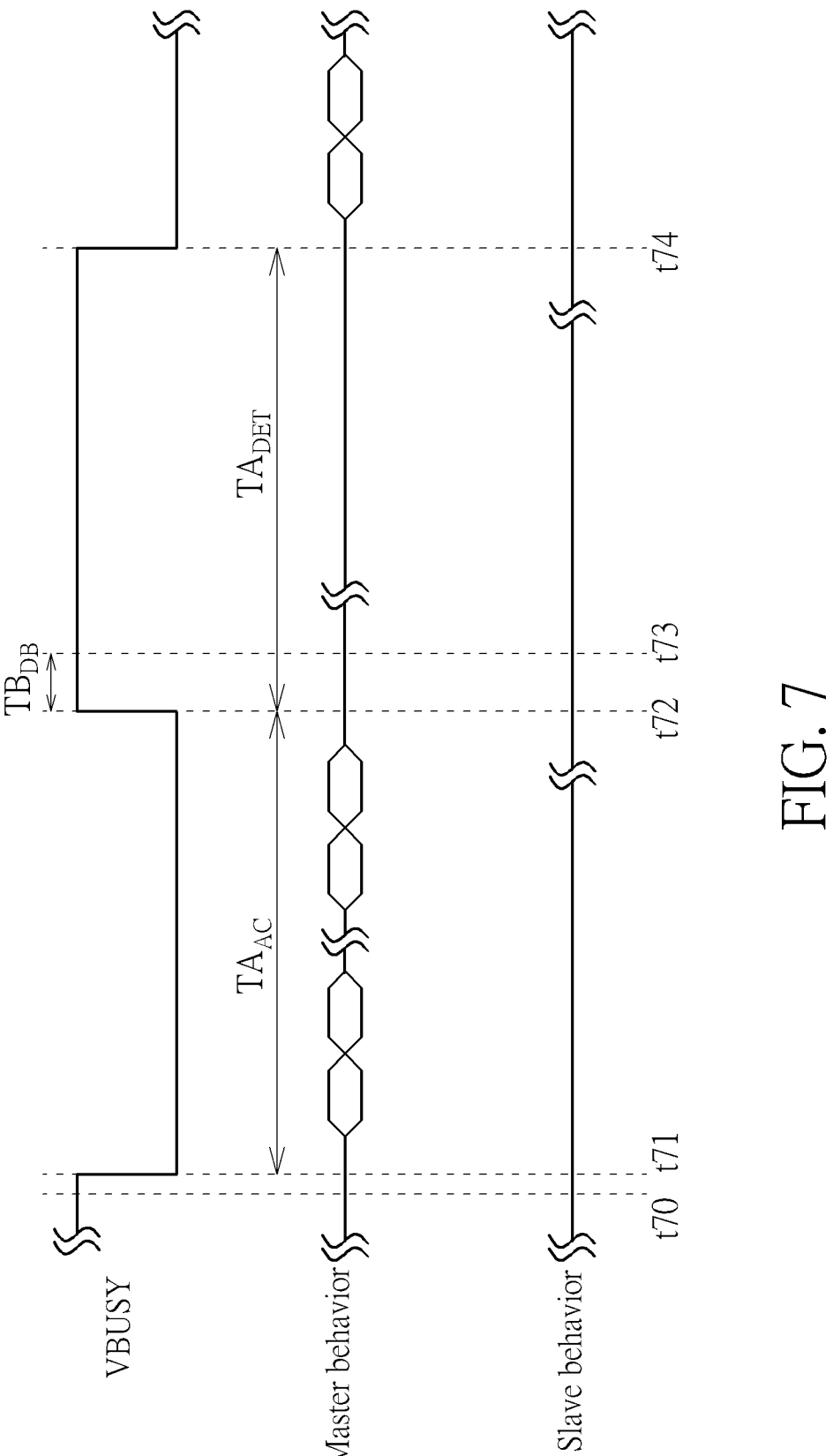
FIG. 7 is a diagram illustrating a timing of error handling in response to a condition where a slave processor is unable to pull down a busy signal after being powered on according to an embodiment of the present invention.

FIG. 7 is a diagram illustrating a timing of error handling in response to a condition where a slave processor (e.g., the CPU 110B shown in FIG. 1) is unable to pull down the busy signal VBUSY after being powered on according to an embodiment of the present invention. In this embodiment, the electronic device 10 may be powered on at a time point t70, and the CPUs 110A and 110B may enter the idle mode. At a time point t71, the CPU 110A may enter the access mode from the idle mode and pull the busy signal VBUSY from the logic value "1" to the logic value "0", and the CPU 110B may enter the detection mode. At a time point t72, the CPU 110A may enter the detection mode in response to the access time thereof reaching the predetermined access time threshold $TA_{AC}$, where the CPU110A may utilize the counter 115C4 to start counting at the time point t72, to generate a detection time. If the CPU 110B is unable to pull the busy signal VBUSY to the logic value "0" in response to the debounce time thereof expiring at a time point t73, the signal control circuit 115F in the CPU 110A may control the CPU 110A to enter the access mode from the detection mode in response to the detection time of the CPU 110A reaching a detection time threshold $TA_{DET}$ and the logic value of the busy signal VBUSY being maintained at "1". Thus, under a condition where the CPU 110B is unable to normally pull down the busy signal VBUSY, the CPU 110A still can access the flash memory 100. It should be noted that the detection time threshold $TA_{DET}$ and the detection time threshold $TB_{DET}$ may be stored in registers of the CPUs 110A and 110B, respectively, and may be set or adjusted by external writing, but the present invention is not limited thereto. In addition, the detection time threshold $TA_{DET}$ and the detection time threshold $TB_{DET}$ may be the same or different.

Figure 8:
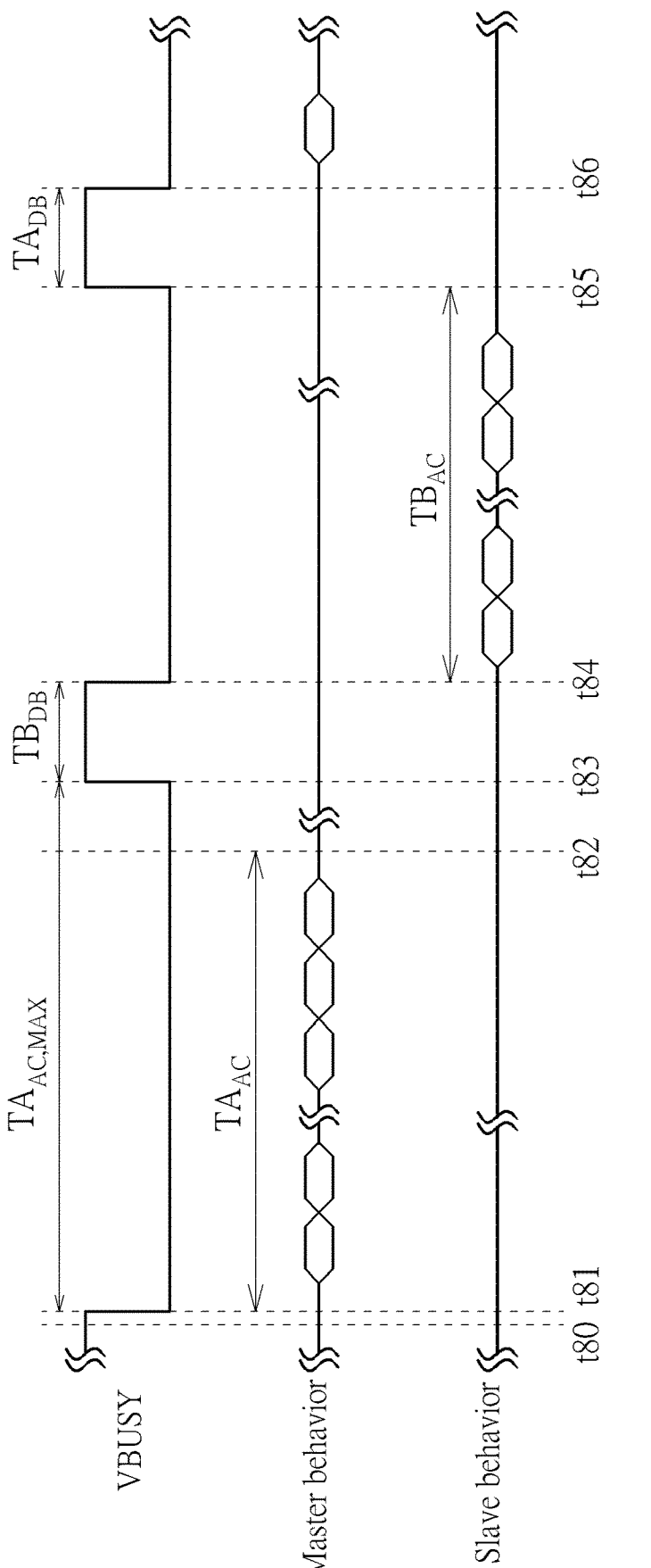
FIG. 8 is a diagram illustrating a timing of error handling in response to a condition where a master processor is unable to release a busy signal after access is completed according to an embodiment of the present invention.

FIG. 8 is a diagram illustrating a timing of error handling in response to a condition where a master processor (e.g., the CPU 110A shown in FIG. 1) is unable to release the busy signal VBUSY after access is completed according to an embodiment of the present invention. In this embodiment, the electronic device 10 may be powered on at a time point t80, and the CPUs 110A and 110B may enter the idle mode. At a time point t81, the CPU 110A may enter the access mode from the idle mode and pull the busy signal VBUSY from the logic value "1" to the logic value "0", and the CPU 110B may enter the detection mode. Even though the state machine 115M in the CPU 110A is unable to release the busy signal VBUSY back to the logic value "1" in response to the access time thereof reaching the predetermined access time threshold $TA_{AC}$ at a time point t82, the signal control circuit 115F in the CPU 110A may force the CPU 110A to enter the detection mode from the access mode in response to the access time thereof reaching a maximum access time threshold $TA_{AC,MAX}$ at a time point t83, in order to make the busy signal VBUSY be released back to the logic value "1" from the logic value "0", where the maximum access time threshold $TA_{AC,MAX}$ is greater than the predetermined access time threshold $TA_{AC}$. After the problem of the CPU 110A failing to release the busy signal VBUSY in response to the access time expiring is solved, the CPU 110B may enter the access mode at a time point t84 and enter the detection mode at a time point t85, and the CPU 110A may enter the access mode at a time point t86. Thus, under a condition where the CPU 110A is unable to release the busy signal VBUSY in response to the access time expiring after the access is completed, the CPUs 110A and 110B are still able to access the flash memory 100 by turns.

Figure 9:
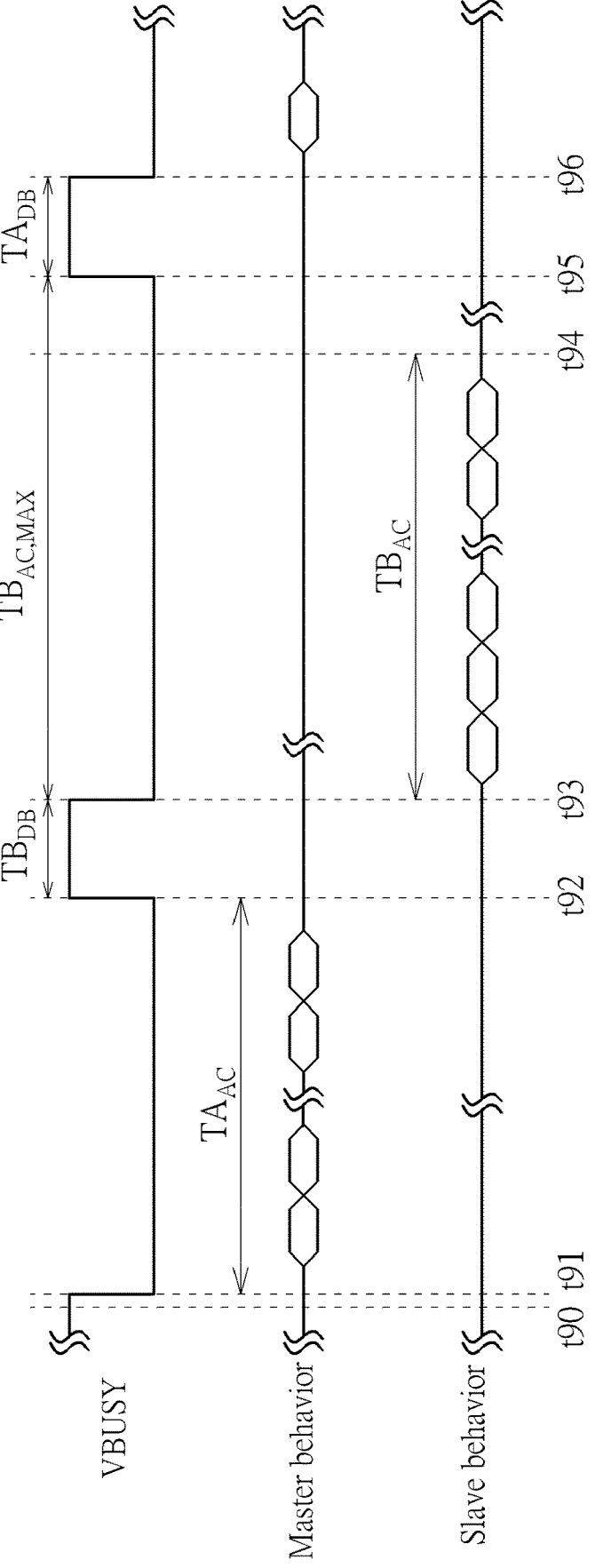
FIG. 9 is a diagram illustrating a timing of error handling in response to a condition where a slave processor is unable to release a busy signal after access is completed according to an embodiment of the present invention.

FIG. 9 is a diagram illustrating a timing of error handling in response to a condition where a slave processor (e.g., the CPU 110B shown in FIG. 1) is unable to release the busy signal VBUSY after access is completed according to an embodiment of the present invention. In this embodiment, the electronic device 10 may be powered on at a time point t90, and the CPUs 110A and 110B may enter the idle mode. At a time point t91, the CPU 110A may enter the access mode from the idle mode, and the CPU 110B may enter the detection mode from the idle mode. The CPU 110A may enter the detection mode in response to the access time expiring at a time point t92, and the CPU 110B may enter the access mode in response to the debounce time expiring. Even though the state machine 115M in the CPU 110B is unable to release the busy signal VBUSY back to the logic value "1" in response to the access time thereof reaching the predetermined access time threshold $TB_{AC}$ at a time point t94, the signal control circuit 115F in the CPU 110B may force the CPU 110B to enter the detection mode from the access mode in response to the access time thereof reaching a maximum access time threshold $TB_{AC,MAX}$ at a time point t95, in order to make the busy signal VBUSY be released back to the logic value "1" from the logic value "0", where the maximum access time threshold $TB_{AC,MAX}$ is greater than the predetermined access time threshold $TB_{AC}$. After the problem of the CPU 110B failing to release the busy signal VBUSY in response to the access time expiring is solved, the CPU 110A may enter the access mode in response to the debounce time expiring at a time point t96. Thus, under a condition where the CPU 110B is unable to release the busy signal VBUSY in response to the access time expiring after the access is completed, the CPUs 110A and 110B are still able to access the flash memory 100 by turns. It should be noted that the maximum access time threshold $TA_{AC,MAX}$ and the maximum access time threshold $TB_{AC,MAX}$ may be stored in registers in the CPUs 110A and 110B, respectively, and may be set or adjusted by external writing, but the present invention is not limited thereto. In addition, the maximum access time threshold $TA_{AC,MAX}$ and the maximum access time threshold $TB_{AC,MAX}$ may be the same or different.

Figure 10:
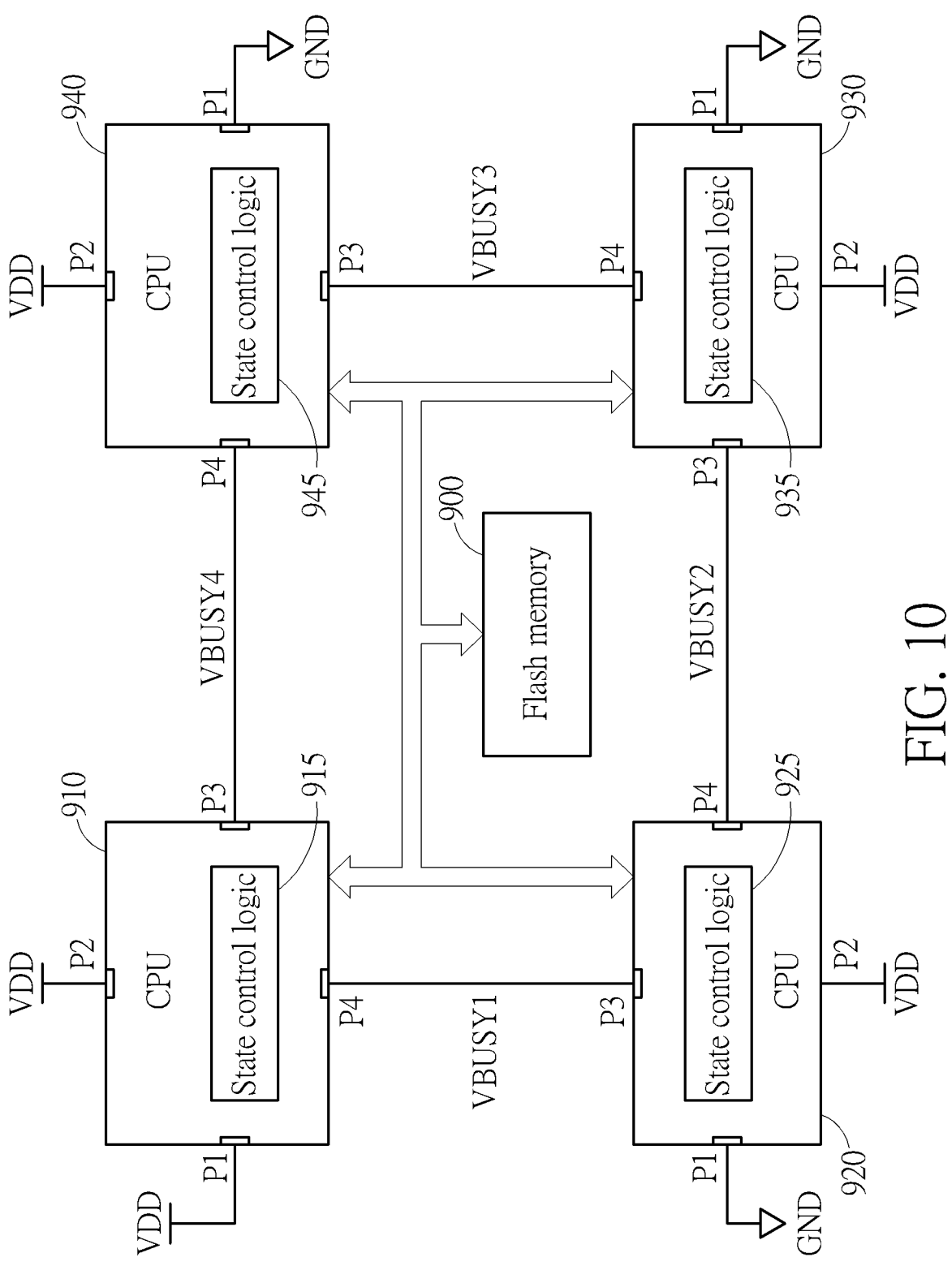
FIG. 10 is a diagram illustrating of four processors sharing one storage device according to an embodiment of the present invention.

It should be noted that the sharing control scheme proposed by the present invention is not limited to the architecture of two processors sharing one storage device. FIG. 10 is a diagram illustrating four processors such as CPUs 910, 920, 930 and 940 sharing one storage device such as a flash memory 900 according to an embodiment of the present invention, where the CPUs 910, 920, 930 and 940 comprise state control logics 915, 925, 935 and 945, respectively, and each of the CPUs 910, 920, 930 and 940 comprises GPIOs P1, P2, P3 and P4. In this embodiment, any (e.g., each) of the state control logics 915, 925, 935 and 945 may be implemented based on the state control logic 115 shown in FIG. 3, but the present invention is not limited thereto. In addition, SPI pins of each of the CPUs 910, 920, 930 and 940, which are configured to communicate with the flash memory 900, may be coupled to one another. For example, the SPI pins of the CPU 910, the SPI pins of the CPU 920, the SPI pins of the CPU 930, and the SPI pins of the CPU 940 may be shorted with one another, and coupled to a CE pin, a clock pin, a SI pin, a SO pin, etc. of the flash memory 900. In this embodiment, purposes of the GPIOs P1 and P2 of each of the CPUs 910, 920, 930 and 940 are the same as in the embodiment of FIG. 1, and are not repeated here for brevity. More particularly, the GPIO P1 of the CPU 910 is coupled to the power supply voltage VDD, and GPIOs P1 of the CPUs 920, 930 and 940 are coupled to the ground voltage GND. Thus, the CPU 910 may have permission to first access the flash memory 900 after being power on.

In this embodiment, the GPIO P4 of the CPU 910 is coupled to the GPIO P3 of the CPU 920, the GPIO P4 of the CPU 920 is coupled to the GPIO P3 of the CPU 930, the GPIO P4 of the CPU 930 is coupled to the GPIO P3 of the CPU 940, and the GPIO P4 of the CPU 940 is coupled to the GPIO P3 of the CPU 910. In this embodiment, the CPU 910 may control a logic value of a busy signal VBUSY1 via the GPIO P4 thereof, the CPU 920 may control a logic value of a busy signal VBUSY2 via the GPIO P4 thereof, the CPU 930 may control a logic value of a busy signal VBUSY3 via the GPIO P4 thereof, and the CPU 940 may control a logic value of a busy signal VBUSY4 via the GPIO P4 thereof. The CPU 910 may detect the logic value of the busy signal VBUSY4 via the GPIO P3 thereof, the CPU 920 may detect the logic value of the busy signal VBUSY1 via the GPIO P3 thereof, the CPU 930 may detect the logic value of the busy signal VBUSY2 via the GPIO P3 thereof, and the CPU 940 may detect the logic value of the busy signal VBUSY3 via the GPIO P3 thereof.

Figure 11:
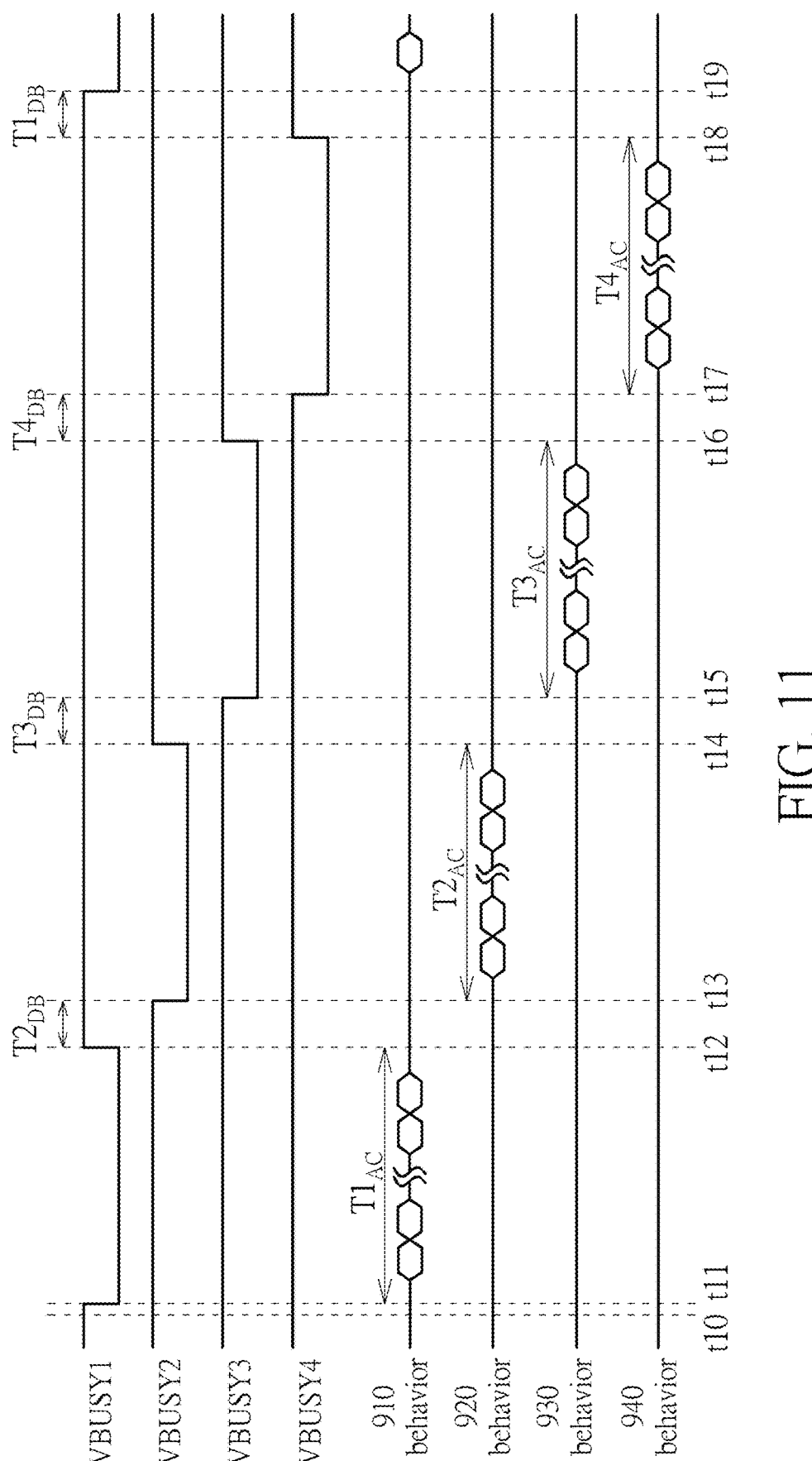
FIG. 11 is a diagram illustrating a timing of four processors accessing one storage device by turns according to an embodiment of the present invention.

FIG. 11 is a diagram illustrating a timing of four processors (e.g., the CPUs 910, 920, 930 and 940 shown in FIG. 10) accessing one storage device (e.g., the flash memory 900) by turns according to an embodiment of the present invention, where access operations of the CPUs 910, 920, 930 and 940 to the flash memory 900 are respectively labeled "910 behavior", "920 behavior", "930 behavior" and "940 behavior" for brevity.

In this embodiment, the CPUs 910, 920, 930 and 940 may be powered on at a time point t10 and enter the idle mode, making the busy signals VBUSY1, VBUSY2, VBUSY3 and VBUSY4 be initialized to the logic value "1". At a time point t11, the CPU 910 may enter the access mode from the idle mode, and the CPUs 920, 930 and 940 may enter the detection mode from the idle mode. When the CPU 910 enters the access mode at the time point t11, the CPU 910 may control the logic value of the busy signal VBUSY1, and more particularly, may pull the busy signal VBUSY1 from the logic value "1" to the logic value "0", in order to indicate that the CPU 910 has the permission to access the flash memory 900 at this moment. In addition, the CPU 910 may start counting at the time point t11, to generate an access time. When the access time of the CPU 910 reaches a predetermined access time threshold $T1_{AC}$ at a time point t12, the CPU 910 may release the busy signal VBUSY1 back to the logic value "1" from the logic value "0" and enter the detection mode.

When the CPU 920 detects that the busy signal VBUSY1 is released back to the logic value "1" from the logic value "0" at the time point t12, the CPU 920 may start counting, to generate a debounce time. When the debounce time of the CPU 920 reaches a debounce time threshold $T2_{DB}$ at a time point t13, the CPU 920 may enter the access mode from the detection mode. When the CPU 920 enters the access mode at the time point t13, the CPU 920 may control the logic value of the busy signal VBUSY2, and more particularly, may pull the busy signal VBUSY2 from the logic value "1" to the logic value "0", in order to indicate that the CPU 920 has the permission to access the flash memory 900 at this moment. In addition, the CPU 920 may start counting at the time point t13, to generate an access time. When the access time of the CPU 920 reaches a predetermined access time threshold $T2_{AC}$ at a time point t14, the CPU 920 may release the busy signal VBUSY2 back to the logic value "1" from the logic value "0" and enter the detection mode.

When the CPU 930 detects that the busy signal VBUSY2 is released back to the logic value "1" from the logic value "0" at the time point t14, the CPU 930 may start counting, to generate a debounce time. When the debounce time of the CPU 930 reaches a debounce time threshold $T3_{DB}$ at a time point t15, the CPU 930 may enter the access mode from the detection mode. When the CPU 930 enters the access mode at the time point t15, the CPU 930 may control the logic value of the busy signal VBUSY3, and more particularly, may pull the busy signal VBUSY3 from the logic value "1" to the logic value "0", in order to indicate that the CPU 930 has the permission to access the flash memory 900 at this moment. In addition, the CPU 930 may start counting at the time point t15, to generate an access time, where when the access time of the CPU 930 reaches a predetermined access time threshold $T3_{AC}$ at a time point t16, the CPU 930 may release the busy signal VBUSY3 back to the logic value "1" from the logic value "0" and enter the detection mode.

When the CPU 940 detects that the busy signal VBUSY3 is released back to the logic value "1" from the logic value "0" at the time point t16, the CPU 940 may start counting, to generate a debounce time. When the debounce time of the CPU 940 reaches a debounce time threshold $T4_{DB}$ at a time point t17, the CPU 940 may enter the access mode from the detection mode. When the CPU 940 enters the access mode at the time point t17, the CPU 940 may control the logic value of the busy signal VBUSY4, and more particularly, may pull the busy signal VBUSY4 from the logic value "1" to the logic value "0", in order to indicate that the CPU 940 has the permission to access the flash memory 900 at this moment. In addition, the CPU 940 may start counting at the time point t17, to generate an access time, where when the access time of the CPU 940 reaches a predetermined access time threshold $T4_{AC}$ at a time point t18, the CPU 940 may release the busy signal VBUSY4 back to the logic value "1" from the logic value "0" and enter the detection mode.

When the CPU 910 detects that the busy signal VBUSY4 is released back to the logic value "1" from the logic value "0" at the time point t18, the CPU 910 may start counting, to generate a debounce time. When the debounce time of the CPU 910 reaches a debounce time threshold $T1_{DB}$ at a time point t19, the CPU 910 may enter the access mode from the detection mode. When the CPU 910 enters the access mode at the time point t19, the CPU 910 may control the logic value of the busy signal VBUSY1, and more particularly, may pull the busy signal VBUSY1 from the logic value "1" to the logic value "0", in order to indicate that the CPU 910 has the permission to access the flash memory 900 at this moment. Thus, the CPUs 910, 920, 930 and 940 may control logic values of the busy signal VBUSY1, VBUSY2, VBUSY3 and VBUSY4, respectively, in order to achieve the purpose of accessing the flash memory 900 by turns.

Figure 12:
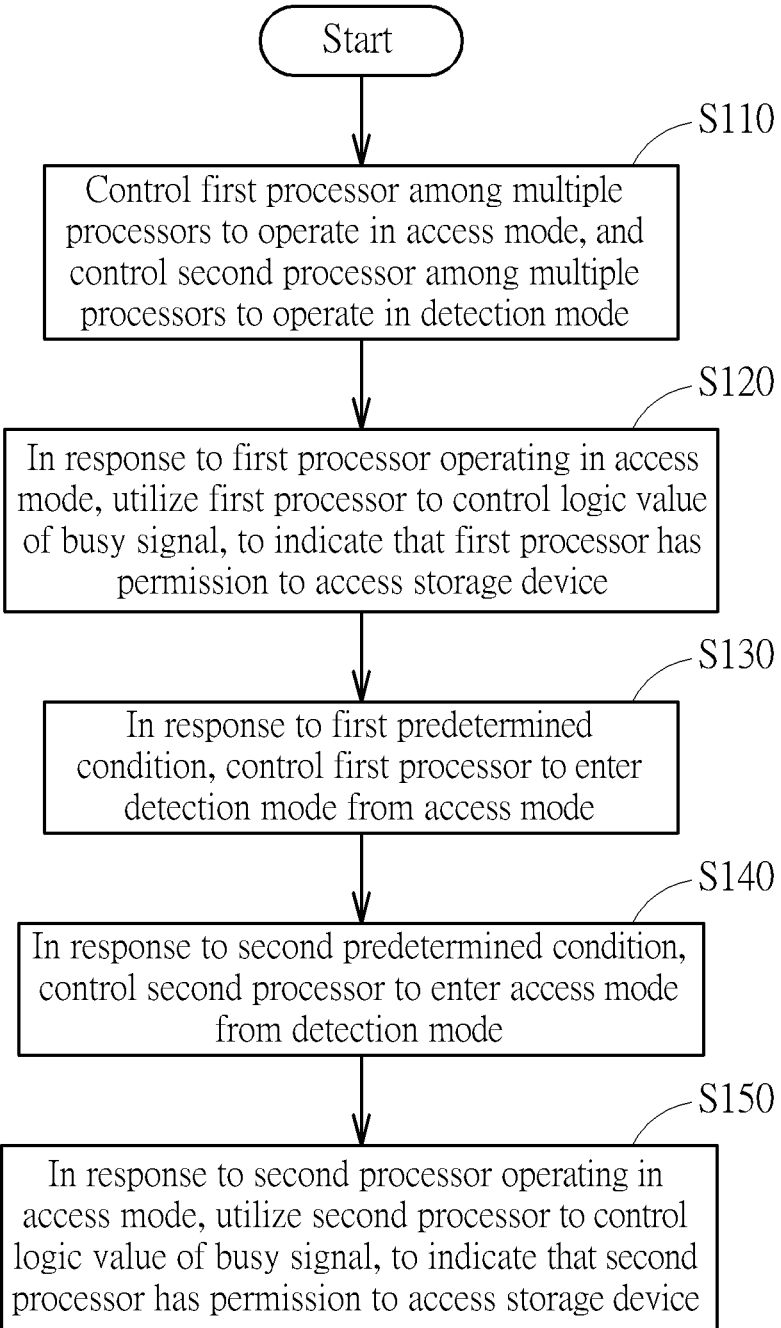
FIG. 12 is a diagram illustrating a working flow of a method for sharing a storage device among multiple processors according to an embodiment of the present invention.

FIG. 12 is a diagram illustrating a working flow of a method for sharing a storage device (e.g., the flash memory 100 shown in FIG. 1) among multiple processors (e.g., the CPUs 11A and 110B shown in FIG. 1) according to an embodiment of the present invention.

In Step S110, an electronic device (e.g., the electronic device 10 shown in FIG. 1) comprising the multiple processors and the storage device may control a first processor among the multiple processors to operate in an access mode, and control a second processor among the multiple processors to operate in a detection mode.

In Step S120, in response to the first processor operating in the access mode, the electronic device may utilize the first processor to control a logic value of a busy signal, to indicate that the first processor has permission to access the storage device.

In Step S130, in response to at least one first predetermined condition, the electronic device may control the first processor to enter the detection mode from the access mode.

In Step S140, in response to at least one second predetermined condition, the electronic device may control the second processor to enter the access mode from the detection mode.

In Step S150, in response to the second processor operating in the access mode, the electronic device may utilize the second processor to control the logic value of the busy signal, to indicate that the second processor has the permission to access the storage device.

It should be noted that the working flow shown in FIG. 12 is for illustrative purposes only, and is not meant to be a limitation of the present invention. More particularly, if a same result can be obtained, one or more steps may be added, deleted or modified in the working flow shown in FIG. 12. In addition, these steps do not have to be executed in the exact order shown in FIG. 12. For example, the working flow shown in FIG. 12 may be applied to the architecture of four processors sharing one storage device shown in FIG. 10, and any two adjacent CPUs among the CPUs 910, 920, 930 and 940 may be examples of the first processor and the second processor mentioned above. In detail, the operation of utilizing the first processor to control the logic value of the busy signal in Step S120 may be replaced with an operation of utilizing the first processor to control a logic value of a first busy signal, and the operation of utilizing the second processor to control the logic value of the busy signal in Step S150 may be replaced with an operation of utilizing the second processor to control a logic value of a second busy signal, where any two consecutive busy signals among the busy signals VBUSY1, VBUSY2, VBUSY3 and VBUSY4 (e.g., the busy signals {VBUSY1, VBUSY2}, {VBUSY2, VBUSY3}, {VBUSY3, VBUSY4} or {VBUSY4, VBUSY1}) may be examples of the first busy signal and the second busy signal.

To summarize, the embodiments of the present invention control multiple processors to alternately switch between an access mode and a detection mode, and make each processor able to actively control a logic value of a corresponding busy signal during a period of operating in the access mode. Based on this control scheme, when an abnormal event occurs during operation of any of the multiple processors, the other processors can respectively utilize counting mechanisms to detect the abnormal event and perform associated handling, in order to prevent the processors operating normally from failing to access the shared storage device due to the processor operating abnormally. In addition, these embodiments will not greatly increase additional costs, and can solve the problem of the related art without introducing any side effect or in a way that is less likely to introduce side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for sharing a storage device among multiple processors, comprising:
   controlling a first processor among the multiple processors to operate in an access mode, and controlling a second processor among the multiple processors to operate in a detection mode;
   in response to the first processor operating in the access mode, utilizing the first processor to control a logic value of a busy signal, to indicate that the first processor has permission to access the storage device, wherein the busy signal is a single-bit signal;
   in response to at least one first predetermined condition, controlling the first processor to enter the detection mode from the access mode;
   in response to at least one second predetermined condition, controlling the second processor to enter the access mode from the detection mode; and
   in response to the second processor operating in the access mode, utilizing the second processor to control the logic value of the busy signal, to indicate that the second processor has the permission to access the storage device;
   wherein utilizing the first processor to control the logic value of the busy signal to indicate that the first processor has the permission to access the storage device in response to the first processor operating in the access mode comprises:
      in response to the first processor operating in the access mode, utilizing the first processor to pull the busy signal from a first logic value to a second logic value;

wherein controlling the first processor to enter the detection mode from the access mode in response to the at least one first predetermined condition comprises:

starting counting time at a time point of the first processor pulling the busy signal from the first logic value to the second logic value, to generate an access time;

wherein the first processor comprises a first state machine and a first signal control circuit; in response to the first state machine being unable to release the busy signal back to the first logic value in response to the access time reaching a predetermined access time threshold, the first signal control circuit forces the first processor to enter the detection mode from the access mode in response to the access time reaching a maximum access time threshold, in order to make the busy signal be released back to the first logic value from the second logic value; and the maximum access time threshold is greater than the predetermined access time threshold.

2. The method of claim 1, wherein the first processor and the second processor are alternately switched between the access mode and the detection mode, to make the first processor and the second processor control the logic value of the busy signal by turns.

3. The method of claim 1, wherein the first state machine controls the first processor to enter the detection mode from the access mode in response to the access time reaching the predetermined access time threshold.

4. The method of claim 1, wherein the first signal control circuit controls the first processor to enter the detection mode from the access mode in response to the first processor not sending any access instruction and the access time reaching a minimum access time threshold, in order to make the busy signal be released back to the first logic value from the second logic value.

5. The method of claim 1, wherein controlling the second processor to enter the access mode from the detection mode in response to the at least one second predetermined condition comprises:

starting counting time at a time point of the first processor releasing the busy signal back to the first logic value from the second logic value, to generate a debounce time;

wherein the second processor comprises a second state machine, and the second state machine controls the second processor to enter the access mode from the detection mode in response to the debounce time reaching a debounce time threshold.

6. The method of claim 1, wherein controlling the second processor to enter the access mode from the detection mode in response to the at least one second predetermined condition comprises:

starting counting time at a time point of the second processor starting operating in the detection mode, to generate a detection time;

wherein the second processor comprises a second signal control circuit, and the second signal control circuit controls the second processor to enter the access mode from the detection mode in response to the detection time reaching a detection time threshold, in order to pull the busy signal from the first logic value to the second logic value.

7. The method of claim 1, wherein an electronic device comprises the multiple processors and the storage device, an update equipment writes an updated program code into the storage device to perform a firmware update of the electronic device during a period of the first processor operating in the access mode, and the method further comprises:

after the updated program code is completely written into the storage device, utilizing the update equipment to perform a soft reset on the first processor, and releasing the busy signal back to the first logic value from the second logic value; and utilizing at least one counter of the second processor to start counting time at a time point of starting the firmware update to generate an update time, and performing the soft reset of the second processor in response to the update time reaching an update time threshold and the busy signal being released back to the first logic value from the second logic value.

8. The method of claim 1, wherein the first processor comprises at least one first counter, the second processor comprises at least one second counter, the at least one first counter performs counting time based on a clock signal, and the at least one second counter performs counting time based on the clock signal.

9. An electronic device, comprising:

a storage device, storing data and a program code; and multiple processors, coupled to the storage device, controlling operations of the electronic device according to the data or the program code stored in the storage device, wherein:

when a first processor among the multiple processors operates in an access mode, a logic value of a busy signal is controlled by the first processor, to indicate that the first processor has permission to access the storage device, and a second processor among the multiple processors operates in a detection mode, wherein the busy signal is a single-bit signal;

when an operation of the first processor meets at least one first predetermined condition, the first processor enters the detection mode from the access mode; and when an operation of the second processor meets at least one second predetermined condition, the second processor enters the access mode from the detection mode, wherein when the second processor operates in the access mode, the logic value of the busy signal is controlled by the second processor, to indicate that the second processor has the permission to access the storage device;

wherein when the first processor operates in the access mode, the first processor pulls the busy signal from a first logic value to a second logic value;

wherein the first processor comprises:

at least one first counter, starting counting time at a time point of the first processor pulling the busy signal from the first logic value to the second logic value, to generate an access time; and a first signal control circuit, wherein when a first state machine is unable to release the busy signal back to the first logic value in response to the access time reaching a predetermined access time threshold, the first signal control circuit forces the first processor to enter the detection mode from the access mode in response to the access time reaching a maximum access time threshold, in order to make the busy signal be released back to the first logic value from the second logic value, wherein the maximum access time threshold is greater than the predetermined access time threshold.

10. The electronic device of claim 9, wherein the first processor and the second processor are alternately switched between the access mode and the detection mode, to make the first processor and the second processor control the logic value of the busy signal by turns.

11. The electronic device of claim 9, wherein the first processor comprises:

the first state machine, controlling the first processor to enter the detection mode from the access mode in response to the access time reaching the predetermined access time threshold.

12. The electronic device of claim 9, wherein the first signal control circuit controls the first processor to enter the detection mode from the access mode in response to the first processor not sending any access instruction and the access time reaching a minimum access time threshold, in order to make the busy signal be released back to the first logic value from the second logic value.

13. The electronic device of claim 9, wherein the second processor comprises:

at least one second counter, starting counting time at a time point of the first processor releasing the busy signal back to the first logic value from the second logic value, to generate a debounce time; and a second state machine, controlling the second processor to enter the access mode from the detection mode in response to the debounce time reaching a debounce time threshold.

14. The electronic device of claim 9, wherein the second processor comprises:

at least one second counter, starting counting time at a time point of the second processor starting operating in the detection mode, to generate a detection time; and a second signal control circuit, controlling the second processor to enter the access mode from the detection mode in response to the detection time reaching a detection time threshold, in order to pull the busy signal from the first logic value to the second logic value.

15. The electronic device of claim 9, wherein an update equipment writes an updated program code into the storage device to perform a firmware update of the electronic device during a period of the first processor operating in the access mode; after the updated program code is completely written into the storage device, the update equipment performs a soft reset on the first processor to release the busy signal back to the first logic value from the second logic value; and at least one second counter of the second processor starts counting time at a time point of the firmware update being started, to generate an update time, and the soft reset of the second processor is performed in response to the update time reaching an update time threshold and the busy signal being released back to the first logic value from the second logic value.

* * * * *